F. W. FRERICHS.
PROCESS FOR MANUFACTURING AMMONIA.
APPLICATION FILED JAN. 2, 1908.
946,427.
Patented Jan. 11, 1910.
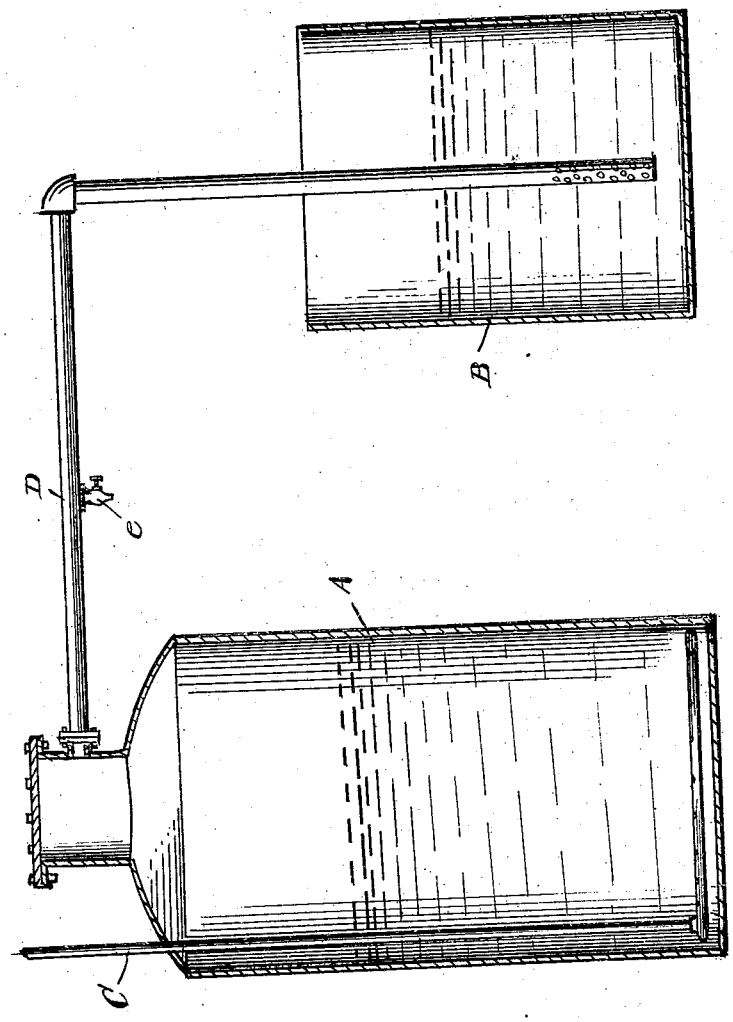
Inventor
Frederick W. Frerichs

UNITED STATES PATENT OFFICE.

FREDERICK W. FRERICHS, OF ST. LOUIS, MISSOURI.

PROCESS FOR MANUFACTURING AMMONIA.

946,427.  Specification of Letters Patent.  Patented Jan. 11, 1910.

Application filed January 2, 1908. Serial No. 409,025.

*To all whom it may concern:*

Be it known that I, FREDERICK W. FRERICHS, a citizen of the United States, residing at St. Louis, in the State of Missouri, have invented certain new and useful Improvements in Processes for Manufacturing Ammonia; and I do hereby declare the following to be a full, clear, and exact description of the invention, such as will enable others skilled in the art to which it appertains to make and use the same.

In the manufacture of liquefied ammonia gas and aqua ammonia from commercial sulfate of ammonium for use in ice machines, it is of the greatest importance that the products be free from volatile carbon compounds and nitrogenous organic compounds, small quantities of which are always present in commercial sulfate of ammonium. The volatile carbon compounds commonly present as impurities are methyl alcohol, ethyl alcohol, isopropyl alcohol, acetone, benzol, toluol, naphthalin, and similar compounds. The nitrogenous organic compounds in commercial sulfate of ammonium are principally the members of the pyridin series and methylamin and its homologues, which are obtained together with ammonia in the dry distillation of coal as a product of the decomposition of the nitrogenous organic compounds contained therein. These impurities will reappear in the ammonia which is made from commercial sulfate of ammonium in the usual way and while not great in amount cause great inconvenience and loss by reducing the capacity of the ice plant in which the ammonia is used. My process removes these impurities in two distinct and independent operations, viz: 1. All of the volatile carbon compounds and most of the nitrogenous organic compounds are removed from the sulfate of ammonium before it is employed in the process of manufacturing liquefied ammonia gas from it, this manufacture being carried on in the usual way. 2. The resulting liquefied ammonia gas which is free from volatile carbon compounds but which contains small quantities of pyridin is freed from this pyridin by redistilling the same with water.

The drawing represents a diagrammatic apparatus in vertical section.

In the drawing a conventional still A is shown and also a receptacle B. Into the still A extends a pipe C provided at the bottom of the still with a perforated coil through which live steam is admitted for the purpose of distilling the contents of the still A. The still A is connected with and to discharge into the receptacle B by means of a pipe D in which is inserted a test cock $e$, the purposes of which are hereinafter described.

The detail work of my process consists in first determining by analysis the amount of the free sulfuric acid and pyridin in the commercial ammonium sulfate, each of which will be found to run from 0.1 to 1.5%. The ammonium sulfate containing the above-named impurities is now dissolved in water, a convenient charge for a distillation being 1250 pounds of sulfate of ammonium dissolved in 2500 pounds of water. For this purpose any suitable apparatus may be employed, a simple apparatus being shown in the drawing comprising the still A connected with a condensing vessel B by a pipe D through which the distillate passes. Pipe D is provided with a test cock $e$. The distillation is carried on by the admission of live steam through the pipe C. For the above amount of sulfate of ammonium containing 1% of free sulfuric acid by analysis, 17.5 pounds of 25% strength aqua ammonia is added to neutralize the 1% or 12.5 pounds of free sulfuric acid contained in the ammonium sulfate. Supposing the 1250 pounds of sulfate of ammonium to contain one tenth of one per cent. (.1%) or 1.25 pounds of pyridin in the form of 2.02 pounds neutral pyridin sulfate $(C_{10}H_{10}N_2+H_2SO_4)$ then by theory $(NH_3)$ would be required to set free the pyridin the ammonia being the stronger base. In actual practice however this amount of $NH_3$ is not sufficient and it is found by experiment that a much larger amount of $NH_3$ must be added, 6.5 pounds of real ammonia $(NH_3)$ in this case being a good proportion. This amount of ammonia, contained in 25 pounds of aqua ammonia 25%, is added to the mixture of the solution of ammonium sulfate and ammonia water already prepared and contained in still A. The contents of still A are now subjected to distillation by admission of live steam through pipe C and distillation is continued until all or practically all of the volatile carbon compounds and most of the pyridin have passed off. After all of the non-nitrogenous volatile carbon compounds and the greater part of the pyridin have been eliminated from the still A, which stage is determined by the smell of pyridin, escaping from the test cock, becoming very faint, 800 pounds of lime are added in the still. This amount is in excess of the quantity theoretically required to produce ammonia, by approximately 300 pounds, but in practice it is found desirable to employ this quantity. This addition of the lime to the sulfate of ammonium is one of the usual well known steps in the process. After the addition of the lime the contents of the still A are again subjected to distillation by the live steam through the pipe C to distil over the ammonia gas through pipe D. The dry ammonia gas is now liquefied by any well known means and produces approximately 300 pounds of liquid ammonia which is free of volatile carbon compounds but contains small quantities of pyridin. In order to remove this pyridin, to this 300 pounds ammonia a suitable amount say 5% or 15 pounds of water are added and the mixture is subjected to distillation, the distillate being pure ammonia gas. The pyridin remains with the water in the still and may be recovered by any of the well known methods now in use.

I claim:—

1. The process of purifying commercial sulfate of ammonium from volatile carbon compounds and nitrogenous organic compounds, which consists in dissolving the sulfate of ammonium in water, adding ammonia in excess of neutralization to the solution, and distilling off the volatile carbon compounds and most of the nitrogenous organic compounds from the alkaline solution of the sulfate of ammonium.

2. The process of purifying liquefied ammonia gas from pyridin which consists in adding water to the liquefied ammonia containing pyridin and subjecting the mixture to distillation, whereby the pyridin is retained in the still by the water which has been added while the pure ammonia is discharged from the distilling apparatus.

In testimony whereof I affix my signature in presence of two witnesses.

FREDERICK W. FRERICHS.

Witnesses:
  J. W. BURROWS,
  M. T. STAMP.